(12) United States Patent
Pham Van et al.

(10) Patent No.: US 12,689,898 B2

(45) Date of Patent: Jul. 21, 2026

(54) METHODS FOR HANDLING SECURITY OF EARLY MOBILE-TERMINATED DATA TRANSMISSIONS

(71) Applicant: TELEFONAKTIEBOLAGET LM ERICSSON (PUBL), Stockholm (SE)

(72) Inventors: Dung Pham Van, Upplands Väsby (SE); Magnus Stattin, Upplands Väsby (SE); Prajwol Kumar Nakarmi, Sollentuna (SE); Tuomas Tirronen, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 583 days.

(21) Appl. No.: 17/602,248

(22) PCT Filed: Apr. 14, 2020

(86) PCT No.: PCT/IB2020/053509

§ 371 (c)(1),
(2) Date: Oct. 7, 2021

(87) PCT Pub. No.: WO2020/208616

PCT Pub. Date: Oct. 15, 2020

(65) Prior Publication Data

US 2022/0159466 A1 May 19, 2022

(30) Foreign Application Priority Data

Apr. 11, 2019 (WO) ................ PCT/CN2019/082185

(51) Int. Cl.
*H04W 12/106* (2021.01)
*H04W 12/03* (2021.01)
(Continued)

(52) U.S. Cl.
CPC ......... *H04W 12/106* (2021.01); *H04W 12/03* (2021.01); *H04W 12/0431* (2021.01); *H04W 68/005* (2013.01)

(58) Field of Classification Search
CPC . H04W 12/03; H04W 12/0431; H04W 12/60; H04W 36/0055; H04W 12/106; H04W 68/005; H04L 9/0866
(Continued)

(56) References Cited

U.S. PATENT DOCUMENTS

| | | | | | |
|---|---|---|---|---|---|
| 11,083,040 | B2 * | 8/2021 | Mildh | ................. | H04W 68/005 |
| 11,122,427 | B2 * | 9/2021 | Ohlsson | ................. | H04W 8/02 |

(Continued)

FOREIGN PATENT DOCUMENTS

| | | | | | |
|---|---|---|---|---|---|
| EP | 2472928 | B1 * | 3/2017 | ............. | H04L 63/20 |
| EP | 3624474 | A1 * | 3/2020 | ............. | H04W 12/02 |

(Continued)

OTHER PUBLICATIONS

Ericsson, "Inactive to Connected state transitions", 3GPP TSG-RAN WG2 #98 Hangzhou, P.R. of China, May 15-19, 2017, R2-1704116 (revision of R2-1702808).

(Continued)

*Primary Examiner* — Lizbeth Torres-Diaz

(74) *Attorney, Agent, or Firm* — Sage Patent Group

(57) ABSTRACT

There is provided a method in a target network node for performing early data transmission (EDT) when a wireless device has suspended a connection from a source network node. The method comprises: receiving ciphered data from a first network node; sending a message to the wireless device, the message comprising the ciphered data; and in response to the sent message, receiving a message from the wireless device, the message allowing the target network (Continued)

node to retrieve a User Equipment (UE) context of the wireless device from the source network node.

19 Claims, 8 Drawing Sheets

(51) Int. Cl.
| | | |
|---|---|---|
| *H04W 12/0431* | (2021.01) | |
| *H04W 68/00* | (2009.01) | |

(58) Field of Classification Search
USPC ............................................................. 726/2
See application file for complete search history.

(56) References Cited

U.S. PATENT DOCUMENTS

| | | | | |
|---|---|---|---|---|
| 11,153,924 | B2 * | 10/2021 | Rugeland ............. | H04W 76/27 |
| 2017/0230928 | A1 * | 8/2017 | Basu Mallick ... | H04W 56/0045 |
| 2020/0162897 | A1 * | 5/2020 | Mildh ................... | H04W 76/27 |
| 2021/0051753 | A1 * | 2/2021 | Ohlsson ................ | H04W 76/11 |
| 2021/0144793 | A1 * | 5/2021 | Kim ...................... | H04W 76/18 |
| 2022/0046490 | A1 * | 2/2022 | Tripathi ............ | H04W 36/0085 |
| 2022/0046491 | A1 * | 2/2022 | Shrestha ........... | H04W 36/0072 |
| 2022/0159466 | A1 * | 5/2022 | Pham Van ............ | H04W 12/03 |
| 2022/0256606 | A1 * | 8/2022 | Pham Van ............ | H04L 1/1854 |

FOREIGN PATENT DOCUMENTS

| | | | | | |
|---|---|---|---|---|---|
| WO | WO-2017085621 | A1 * | 5/2017 | ............ | H04W 12/06 |
| WO | WO-2018229680 | A1 * | 12/2018 | ........ | H04W 36/0033 |
| WO | WO-2019202451 | A1 * | 10/2019 | ............ | H04W 76/30 |

OTHER PUBLICATIONS

Huawei, Hilsilicon, 3GPP TSG SA WG3 (Security) Meeting #93, "Discussion on UP Integrity Protection for Small Data In Early Data Transfer", S3-183409, Nov. 12-16, 2018, Spokane (US).

Ericsson, "Inactive to Connected state transitions," 3GPP TSG-RAN WG2 #98, Spokane, USA, Apr. 3-7, 2017, pp. 1-6, Tdoc R2-1702808, 3GPP.

Ericsson, "Mobile-terminated early data transmission", 3GPP TSG-RAN WG2 #103bis, R2-1814340, Chengdu, P.R. China, Oct. 8-12, 2018.

Ericsson: 3GPP TSG-RAN WG2 #101Bis Tdoc R2-1805632, "Way forward with Security in RRC Inactive", Tdoc R2-1805632 (Revision of R2-1802372), Sanya, P.R. of China, Apr. 16-20, 2018.

3GPP, TS 36.331, "RRC protocol specification"; v14.4.0, Sep. 2017.

3GPP, TS 36.321, "MAC protocol specification", v14.4.0, Sep. 2017.

3GPP, TS 36.413, "S1-AP protocol specification", v14.4.0, Sep. 2017.

3GPP, TS 36.412, "3rd Generation Partnership Project; Technical Specification Group Radio Access Network; Evolved Universal Terrestrial Radio Access Network (E-UTRAN); S1 signalling transport (Release 15)" V15.0.0, Jun. 2018.

3GPP, TS 36.300, "E-UTRA and E-UTRAN; Overall description; Stage 2", v14.4.0, Sep. 2017.

3GPP, TS 33.401, "3GPP System Architecture Evolution (SAE); Security architecture", v15.1.0, Sep. 2017.

International Search Report and Written Opinion for PCT/IB2020/053509, mailing date of Aug. 14, 2020.

\* cited by examiner

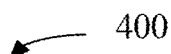

400

| Receiving ciphered data from a first network node |
| :---: |
| 410 |

| Sending a message to the wireless device, the message comprising the ciphered data |
| :---: |
| 420 |

| In response to the sent message, receiving a message from the wireless device, the message allowing the target network node to retrieve a User Equipment (UE) context of the wireless device from the source network node |
| :---: |
| 430 |

Figure 4

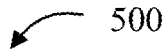

500

| Re-activating a User Equipment (UE) context of the wireless device for ciphering data received from a serving gateway |
| :---: |
| 510 |

| Receiving a request to retrieve the UE context from a target network node |
| :---: |
| 520 |

Figure 5A

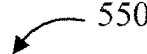

550

| Receiving a request to re-activate a UE context of the wireless device from the source network node |
| :---: |
| 560 |

| Sending a response message to the source network node for re-activating the UE context |
| :---: |
| 570 |

Figure 5B

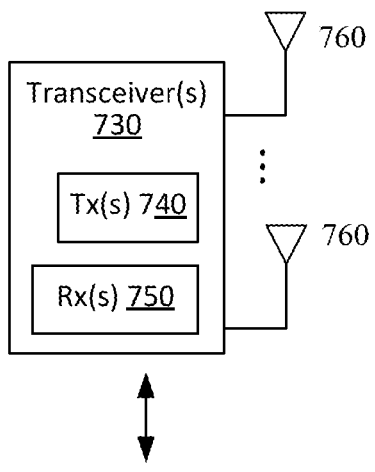
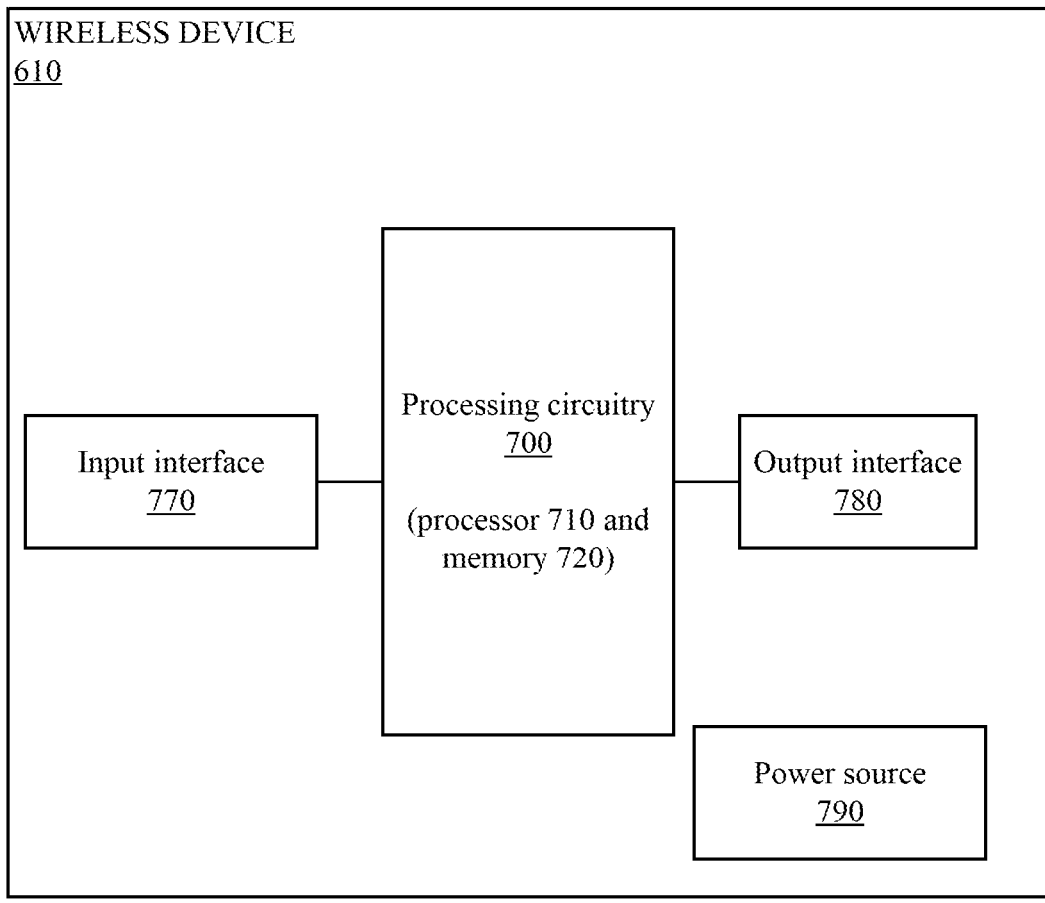
Figure 7

METHODS FOR HANDLING SECURITY OF EARLY MOBILE-TERMINATED DATA TRANSMISSIONS

RELATED APPLICATIONS

The present application claims the benefits of priority of Patent Application number PCT/CN2019/082185, entitled "Security handling for early mobile-terminated data transmission" and filed on Apr. 11, 2019, the content of which is incorporated herein by reference.

TECHNICAL FIELD

The present description generally relates to wireless communication systems and more specifically to security for handling early transmissions of mobile-terminated data.

BACKGROUND

There has been a lot of work in third Generation Partnership Project (3GPP) lately on specifying technologies to cover Machine-to-Machine (M2M) and/or Internet of Things (IoT) related use cases. Most recent work for 3GPP Releases 13 and 14 includes enhancements to support Machine-Type Communications (MTC) with new User Equipment (UE) categories (Cat-M1, Cat-M2), supporting reduced bandwidth of up to 6 and 24 physical resource blocks (PRBs), and Narrowband IoT (NB-IoT) UEs providing a new radio interface (and UE categories Cat-NB1 and Cat-NB2).

The Long Term Evolution (LTE) enhancements introduced in 3GPP Releases 13, 14, and 15 for MTC are referred to as "eMTC", including (not limiting) support for bandwidth limited UEs, Cat-M1, and support for coverage enhancements. This is to separate discussions from NB-IoT (notation here used for any Release (Rel.)), although the supported features are similar on a general level.

To facilitate the description of the presented solutions, the messages in the Random Access (RA) procedure are commonly referred to as message 1 (Msg1) through message 4 (Msg4). From 3GPP TS 36.300, the contention-based RA procedure is illustrated in FIG. 1.

For both eMTC and NB-IoT, 'Cellular IoT (CIoT) Evolved Packet System (EPS) User Plane (UP) optimization' and 'CIoT EPS Control Plane (CP) optimization' signaling reductions were also introduced in Rel-13. The former, herein referred to as the UP-solution, allows the UE to resume a previously stored Radio Resource Control (RRC) connection (thus also known as RRC Suspend/ Resume). The latter, herein referred to as the CP-solution, allows the transmission of user-plane data over Non-Access Stratum (NAS) signaling, and is also referred to as "DoNAS".

In 3GPP Rel-15, some work items (WIs) introduced enhancements to target eMTC and NB-IoT. The common objective of these WIs is to reduce UE power consumption and latency through introducing possibilities to send data as early as possible during the RA procedure, or commonly referred to as early data transmission (EDT).

EDT has been extensively discussed from RAN2 #99. Since then, it was agreed to support transmission of data in Msg3 only, or in Msg4 only, or in both Msg3 and Msg4 depending on actual use cases for both Rel-13 UP and CP solutions. However, in Rel-15, only the EDT solutions for mobile-originated (MO) calls are specified. In MO EDT solutions, the UE with small UpLink (UL) user data can indicate its intention of using EDT, i.e., sending UL user data in Msg3 by selecting an EDT preamble in Msg1. The base station (e.g. eNB) provides the UE with an EDT UL grant in Msg2 that allows the UE to transmit UL data together with signaling in Msg3. Depending on UL data condition, the UE can select a suitable (possible smallest) value of transport block size (TBS) among the possible values specified based on the maximum TBS value and the permitted number of blind decodes (i.e., number of TBS values smaller than the maximum value) informed by the eNB via system information. DL data (if any) can be included in Msg4 together with signaling that indicates the UE to return RRC_IDLE mode for power saving improvements if no more data transmission is expected. But if there is more user data, the network can, in Msg4, indicate the UE to move to the RRC CON-NECTED mode, i.e., establishing or resuming the RRC connection as in legacy for further data transmissions.

In the Rel-16, in WIDs for both eMTC and NB-IoT, one of the objectives is to specify support for Mobile Terminated (MT) EDT.

The objective is to specify the following set of improvements for machine-type communications for Bandwidth reduced Low complexity (BL)/Coverage Enhancement (CE) UEs and NB-IoT Frequency Division Duplex (FDD):

Improved DownLink (DL) transmission efficiency and/or UE power consumption:

i. Specify support for MT early data transmission (EDT) [RAN2, RAN3]

MT EDT was discussed in recent RAN2 #103bis and RAN2 #104 meetings with the following agreements:

i. RAN2 intends to support MT-initiated EDT for both CP and UP solutions.

ii. The intention to use MT-EDT is for user data, i.e. not for Non-Access Stratum (NAS) signaling.

iii. MT EDT is evaluated at least based on battery life, network resource efficiency, security, reliability and potential impact on the core network.

iv. MT EDT is intended for DL data which can be transmitted in one transport block.

v. Use cases that require DL data transmission with or without UL data transmission as a response should be supported for MT-EDT.

vi. DL data in paging message is excluded (Option A).

vii. Radio Network Temporary Identity (RNTI) in paging message to schedule the DL data is excluded (Option B).

viii. Working assumption: DL data scheduled, i.e. DL grant, in paging message is excluded (Option C).

ix. Working assumption: DL data scheduled in paging occasion is excluded (Option D).

The agreements mean companies now focus on the two remaining options, i.e., either or both of which will be specified are DL data transmission after the preamble transmission, i.e., Msg2 option and DL data transmission in Msg4, i.e., Msg4 option.

SUMMARY

Currently, there exists some challenges. In the DL data after preamble option, i.e., Msg2-based MT-EDT solution, one possibility is to use the contention-free random access approach where a DL message (hereafter referred to as Msg2) is transmitted by the eNB in response to Msg1, which was transmitted previously using a contention-free preamble.

In the Msg4-based MT-EDT solution, the Rel-15 MO-EDT UP- and CP-solutions can be used to develop MT UPand CP-EDT solutions with minimal changes required. In this approach, the main idea is to have DL user data sent in Msg4 during the contention-based RA procedure.

In case MT-EDT is based on the Msg2-based option, a problem is foreseen with UE context handling in the UP MT-EDT solution. In particular, it remains to be specified how the DL data transmitted to the UE can be protected, i.e., ciphered with proper Access Stratum (AS) security.

In the legacy resume procedure, when a UE resumes to a new (i.e., target) eNB, the target eNB needs to obtain the UE context from the old (source) eNB, where the RRC connection was suspended from. This is done via the X2-AP retrieve UE context procedure. Upon reception of the resume request from the UE in Msg3, the target eNB provides the source eNB with the resumeID and an authentication code, i.e., shortResumeMAC-I received from the RRCConnectionResumeRequest in Msg3. The source eNB locates the UE context using the resumeID and only provides the UE context if the authentication code is successfully verified. However, in case of Msg2-based MT-EDT solution, the target eNB cannot obtain the UE context before it receives any identities or control signaling (e.g., RRC message) from the UE. A solution to the problem has been presented where the target eNB obtains the UE context before the DL data transmission. However, this may require the Mobility Management Entity (MME) and target eNB to provide UE's resumeID to multiple eNBs during the S1 paging and X1 context retrieval procedures, which are not desired from a security viewpoint. Therefore, it is desirable to have an efficient solution for handling UE context so that the UP MT-EDT solution based on Msg2 option can be possible.

Some embodiments propose a solution that allows for efficient handling of security for the MT-EDT Msg2 based solution and thus overcome or mitigate the above challenges. The embodiments are valid for LTE, NB-IoT, and are also applicable for Fifth Generation/New Radio (5G/NR).

According to another aspect, there is provided a method in a network node, such as a target network node, source network node or mobility management entity, for early data transmission.

According to yet another aspect, some embodiments include a network node (such as a base station/eNB/core network node) configured, or operable, to perform one or more functionalities (e.g. actions, operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the network node, configure the processing circuitry to perform one or more functionalities as described herein.

The embodiments of the present disclosure make the UP MT-EDT solution based on transmission of DL data after preamble, i.e., Msg2-based option, possible.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIG. 4 is a flow chart of a method in a target network node, according to some embodiments.

FIG. 5A is a flow chart of a method in a source network node, according to some embodiments.

FIG. 5B is a flow chart of a method in a network node, according to some embodiments.

FIG. 7 is a block diagram that illustrate a wireless device according to some embodiments.

DETAILED DESCRIPTION

Figure 1:
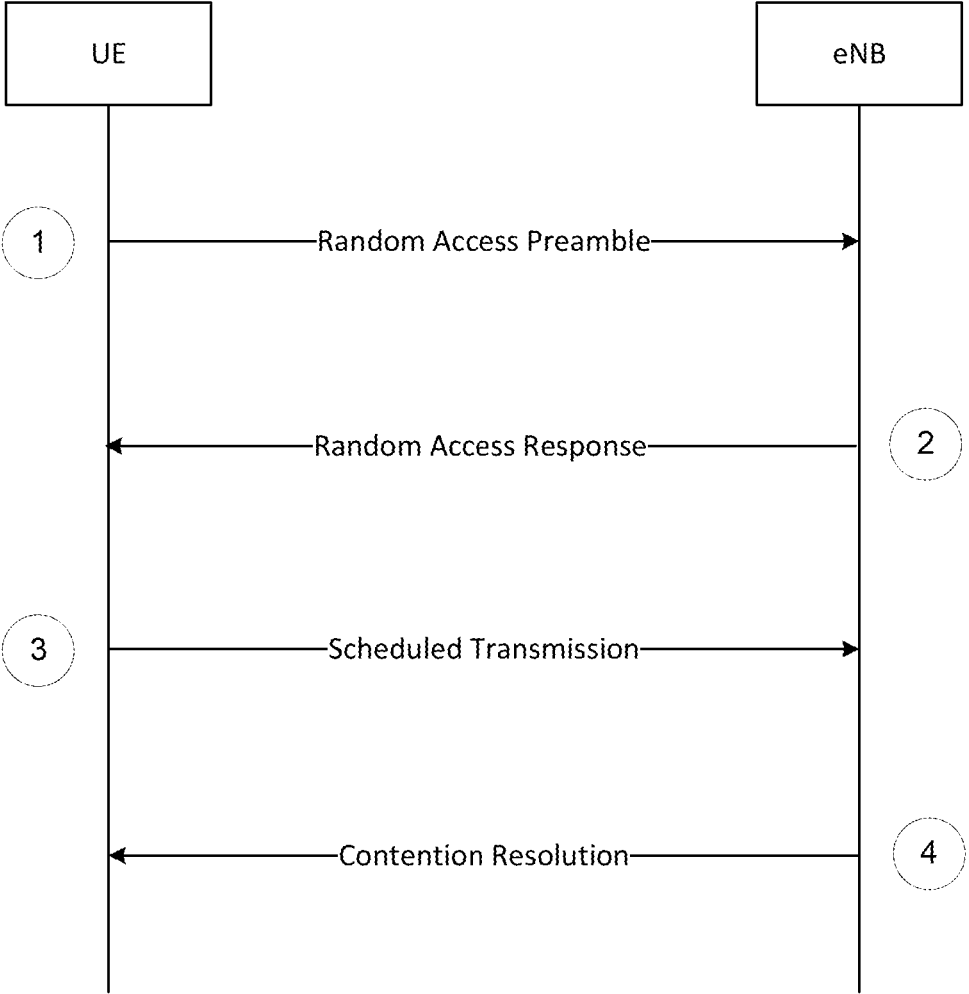
FIG. 1 illustrates a random access procedure.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Embodiments of the present disclosure provide several methods in a network node for handling UE context that enables the UP MT-EDT solution based on DL data after the preamble. For example, a method, for the UE context retrieval to be performed after the DL data transmission with a source eNB providing ciphered DL data to a target eNB, may comprise the following steps:

1) The MME provides/sends to the target eNB, in a S1 paging message, an identifier of the UE. This identifier has been assigned by the source eNB to the UE, for example, it could be the eNB UE S1AP IDentifier (ID). The MME can also send to the target eNB the eNB Identifier (ID) associated with the source eNB.

2) The target eNB sends to the source eNB, via the X2 interface, the received eNB UE S1AP ID for locating the UE context. A new X2-AP procedure can be defined for this purpose or an existing procedure can be extended for this use.

3) The source eNB performs a UE context resume procedure (e.g. S1-AP UE context resume procedure) with the MME to request re-activation of the UE context. The source eNB also fetches DL data from a Serving-Gateway (S-GW). The source eNB then activates the AS security, ciphers the DL data, and forwards the ciphered DL data to the target eNB, through a X2-AP procedure for example. A new X2-AP procedure can be defined for this purpose or an existing procedure can be extended for this use.

4) The target eNB sends the received DL data (ciphered data) in the DL message to the UE.

5) Upon receipt of a protected UL message in response to DL data transmission, the target eNB and source eNB perform the legacy context fetch procedure based on a resumeID sent by the UE. The target eNB performs this step so that the has the UE context, irrespective of having UL user data or not.

In another example, a method for the UE context retrieval to be performed after the DL data transmission, with the MME providing ciphered DL data to the target eNB, may comprise the following steps:

1) The MME determines a MT-EDT and pages the UE in the most recent cell, i.e., source eNB. There should have an indication to let the source eNB know that this is for MT-EDT.

2) Upon reception of the S1 paging message, the source eNB performs the S1-AP UE context resume procedure with the MME to request re-activation of the UE context. The source eNB also fetches DL data from a S-GW. The source eNB then activates the AS security, ciphers the DL data, and forwards the ciphered DL data to the MME in a S1-AP procedure. A new S1-AP procedure can be defined for this purpose.

3) The source eNB sends to the MME the ciphered DL data. The MME stores the received data and forwards a copy to the target eNB. These two steps can be done with newly defined S1-AP procedures, for example.

4) The target eNB then sends the received DL (ciphered) data in a DL message to the UE.

5) Upon reception of a protected UL message in response to the DL data transmission, the target eNB and source eNB perform the legacy context fetch procedure based on a resumeID sent by the UE. This step is mandatory irrespective of having UL user data or not, so that the target eNB has the UE context.

UE context retrieval after DL data transmission with source eNB providing ciphered DL data to target eNB.

Now turning to FIG. 2, the first example will be described in more detail.

Figure 2:
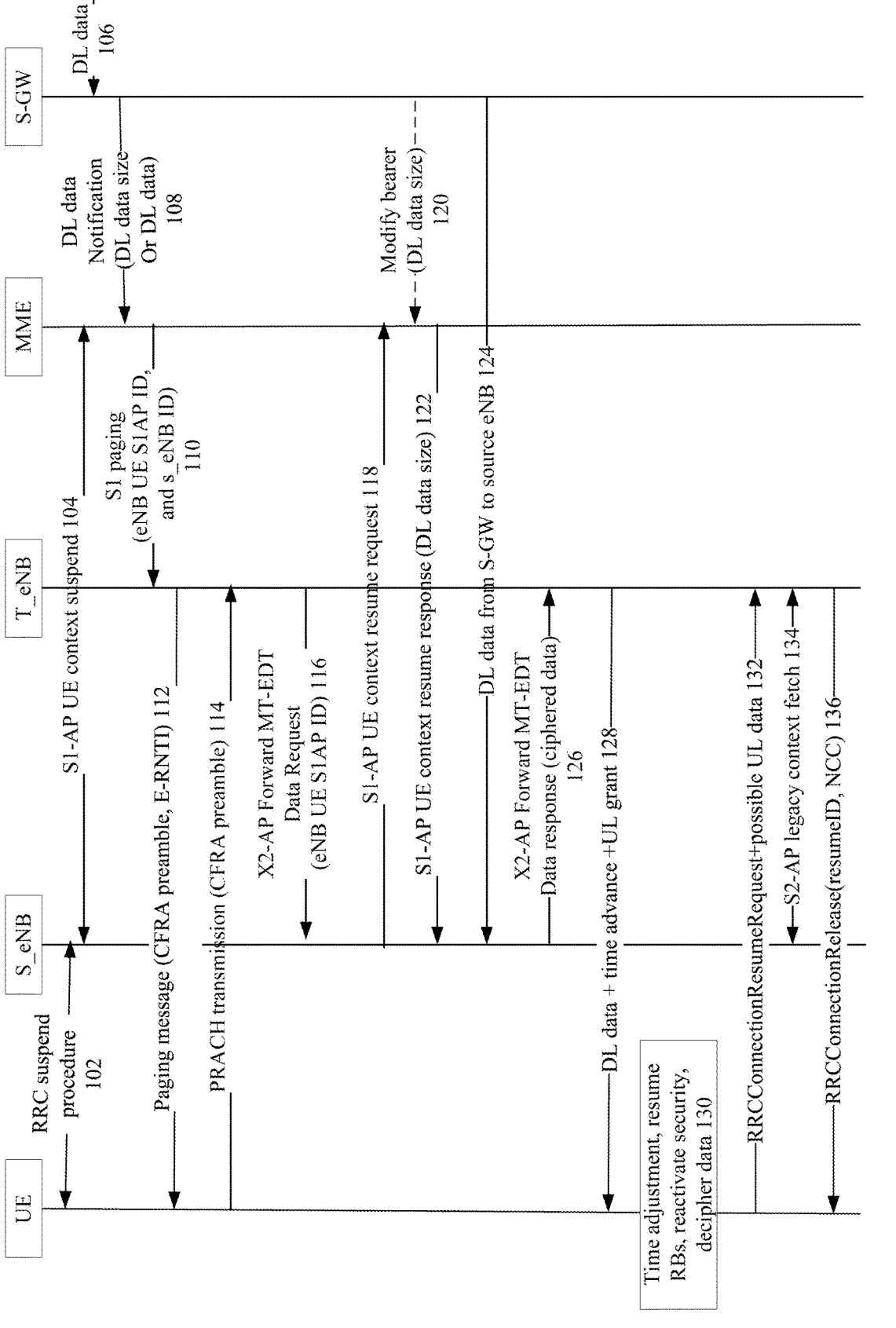
FIG. 2 illustrates a signalling flow for UE context retrieval after DL data transmission in a Msg2-based MT-EDT solution, with a source eNB providing to a target eNB ciphered data, according to some embodiments.

FIG. 2 illustrates an example of a signaling flow in which the UE context retrieval takes place after the DL data transmission, with the source eNB providing ciphered DL data to the target eNB. In FIG. 2, different elements are illustrated, such as a UE, a source eNB (S_eNB), a target eNB (T_eNB), a MME and a serving gateway (S-GW), which are in communication with each other. The signaling flow comprises the following steps:

Step 102: The UE is suspended from its connection with the source eNB. To do so, the RRC suspend procedure is performed between the UE and the s_eNB.

Step 104: The source eNB performs the suspend procedure (e.g. S1-AP UE context suspend procedure) with the MME.

Step 106: The S-GW receives some data from the core network, directed to the UE.

Step 108: The S-GW sends a notification to the MME indicating the incoming DL data. The notification can comprise the DL data and/or the DL data size.

Step 110: The MME sends a S1 paging message to the target eNB. The S1 message may comprise an ID of the UE, such as eNB UE S1AP ID, which is allocated by the source eNB to the UE, and the eNB ID of the source eNB. The source eNB ID allows the target eNB to know which source eNB the UE was suspended from, whereas the eNB UE S1AP ID allows the source eNB to know for which UE it needs to locate the context, as can be seen in the next step. It should be noted that the MME can send the S1 paging message to a plurality of target eNBs and each of the target eNB will try to communicate with the UE and the source eNB.

Step 112: Upon reception of the S1 paging message, the target eNB sends a paging message to the UE with a CFRA preamble and an Enhanced(E)-RNTI, for example.

Step 114: The UE sends a response message to the target eNB, the response message being a PRACH transmission with the CFRA preamble, for example.

Step 116: The target eNB requests the source eNB to perform the context resume procedure. For example, the target eNB sends a X2-AP message, which forwards the MT-EDT data request to the source eNB. The message can also comprise the ID of the UE (e.g. eNB UE S1AP ID) that enables the source eNB to request DL data for the UE associated with the eNB UE S1AP ID. Alternatively, the target eNB can perform step 116 before steps 112 and 114 in FIG. 2. A new X2-AP procedure can be defined for step 116 for example.

Step 118: Upon receipt of the request from the target eNB, the source eNB can perform the UE context resume procedure with the MME, by sending a S1-AP UE context resume request to the MME. The UE context resume procedure allows to reactivate the UE context in the source eNB.

Step 122: the MME responds back to the UE context resume request from the source eNB with a S1-AP UE context resume response.

It should be noted that in step 120, the S-GW can send a message to the MME, to modify the bearers and to provide the DL data size. This step can be done before or after step 118.

Step 124: the source eNB obtains DL data from the S-GW for the UE.

Alternatively, the S-GW can provide the DL data to the MME (see step 108) and the MME can include the DL data in the S1-AP message when responding to the source eNB's context resume request, e.g., when the MME sends the S1-AP UE context resume response (see step 122). The source eNB then ciphers the DL data received from the MME, based on the re-activated UE context (e.g. the AS security).

More specifically, the DL data can be ciphered by the source eNB by using a ciphering key and algorithm based on the stored AS security. Alternatively, the DL data can be ciphered using new AS keys, which can be derived based on the most recent NCC value. In this case, the ciphering keys used for data protection may need to be used again in the target eNB. In addition, the variable count used as a variable input to the security algorithm can be reset at the target eNB. It can be specified that:

i. The source eNB uses a new key to cipher data and the count is not reset at the target eNB, for example, by transferring a sequence number (i.e., count) to the target eNB during the context fetch procedure in step 134.

ii. Alternatively, the source eNB uses a new key to cipher data and the target eNB performs another key derivation to avoid using the already used key.

Step 126: Once the source eNB has ciphered the DL data received from the S-GW, the source eNB replies back to the target eNB with a X2-AP message containing the ciphered DL data.

Step 128: The target eNB then sends the ciphered DL data to the UE in the DL message together with some control information, in response to the PRACH transmission of step 114. The control information may comprise a time advance value and an UL grant, for example.

Step 130: At the UE, upon reception of the ciphered data, the UE performs a time adjustment (to be aligned with the network node) based on the time advance value, re-activates the security/the AS security and resumes the radio bearers. The UE then deciphers the DL data.

Step 132: The UE replies back to the target eNB with a protected UL message, in response to the DL data transmission, irrespective of having UL user data or not. The UL message can include, for example, UL user data and a RRCConnectionResumeRequest comprising a resumeID and shortResumeMAC-I as in Rel-15 MO-EDT. Alternatively, a new RRC message can be defined for this step.

Step 134: Upon reception of the protected UL message (from step 132), the target eNB and source eNB perform the legacy context fetch procedure or some similar new procedure based on the resumeID sent by the UE (in step 132). The context fetch procedure allows the target eNB to have the UE context. The source eNB can then discard the stored DL data.

There may be multiple requests to the source eNB from different target eNBs (see e.g. step 116). To avoid repeating the same context resume and DL data fetch from the S-GW multiple times and to avoid possible loss of user data, the source eNB can store the DL data until further being notified by the target eNB that the DL transmission has been successful. The reception of the X2-AP UE retrieve request in step 134 can be considered as the confirmation that the DL data have been successfully delivered to the UE. Alternatively, the S-GW provides/sends to the source eNB a copy of the DL data and buffers the DL data until it receives a confirmation of a successful data transmission. As another alternative, the S-GW can provide the DL data to the MME, which sends a copy of the DL data to the source eNB. The S-GW buffers the DL data until it receives a confirmation of a successful data transmission.

UE Context Retrieval after DL Data Transmission with MME Providing Target eNB Ciphered DL Data Now turning to FIG. 3, the second example will be described in more detail.

Figure 3:
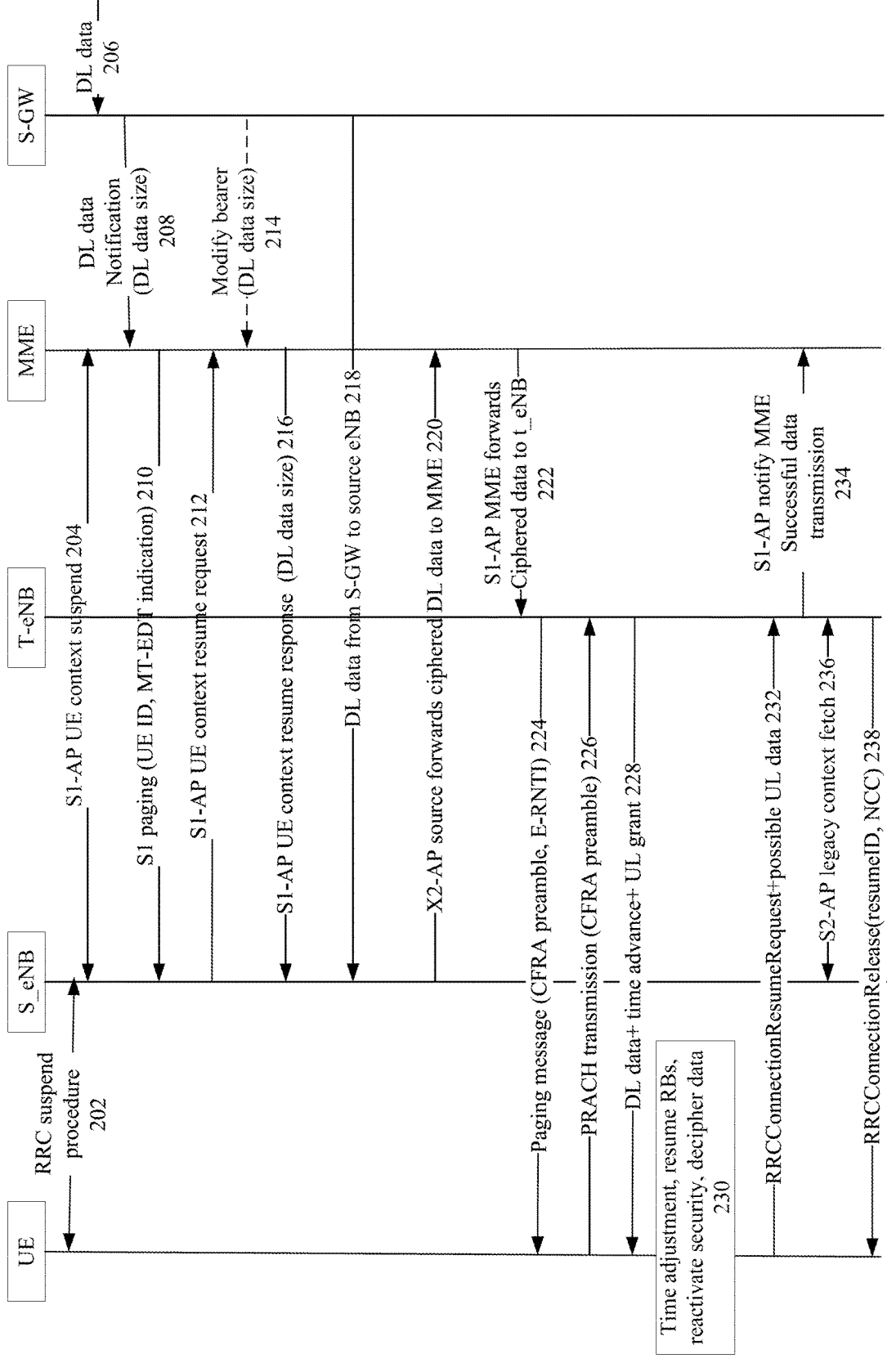
FIG. 3 illustrates a signaling flow for UE context retrieval after DL data transmission in a Msg2-based MT-EDT solution, with a MME providing to a target eNB ciphered data, according to some embodiments.

FIG. 3 illustrates an example of a signaling flow in which the UE context retrieval takes place after the DL data transmission, with the MME providing the ciphered DL data to the target eNB. For example, FIG. 3 illustrates different elements, such as a UE, a source eNB (s_eNB), a target eNB (t_eNB), a MME and a serving gateway (S-GW), being in communication with each other. The signaling flow comprises the following steps:

Step 202: The UE is suspended from its connection with the source eNB. To do so, the UE performs the RRC suspend procedure with the source eNB.

Step 204: The source eNB performs the suspend procedure (e.g. S1-AP UE context suspend procedure) with the MME.

Step 206: The S-GW receives some data from the core network, directed to the UE, for example.

Step 208: The S-GW sends a notification to the MME indicating the incoming DL data. The notification can comprise the DL data and/or the DL data size (e.g. the amount of DL data).

Step 210: Once the MME determines/decides to initiate a MT-EDT, it sends a S1 paging message to the most recent eNB, i.e., source eNB. The MME sends a message to the source eNB. The message can be a S1 paging message with an indication of MT-EDT so that the source eNB can perform the next steps even though the UE is no longer connected with the source eNB. The S1 paging message can also comprise an identifier of the UE (UE ID).

Step 212: Upon reception of the S1 paging message, the source eNB performs the S1 UE context resume procedure with the MME, in order to reactivate the UE context in the source eNB.

Step 214: In case the MME and S-GW perform the Modify bearer procedure, the S-GW can inform the MME of the DL data size. The DL data size can be used by the target eNB to decide whether to release a connection after MT-EDT transmission.

Step 216: Upon receipt of the request from the source eNB, the MME performs the S1-AP UE context resume procedure with the source eNB. The source eNB, after this procedure, can reactivate the UE context. The resume message can include the DL data size of the DL from the S-GW.

Step 218: the source eNB gets the DL data from the S-GW. As an alternative, the S-GW can send the DL data to the MME, which can first store the received DL data and then forward it to the source eNB.

Step 220: The source eNB activates (or reactivates) security based on the reactivated UE context, ciphers the received DL data and sends the ciphered data to the MME (rather than to the target eNB as in the first example of FIG. 2).

Step 222: The MME then forwards the ciphered data to the target eNB in a message such as the S1-AP message. New X2 and 51 procedures and messages can be defined to be used in steps 220 and 222. Alternatively, existing procedures and messages can be extended/used for this purpose. Also, the message sent by the MME to the target eNB could include the DL data size, which enables the target eNB to know if it needs to release connections or not.

The MME stores the ciphered DL data until further being notified by the target eNB that the DL transmission has been successful. Alternatively, the S-GW can provide the source eNB with a copy of the DL data. In this case, the S-GW buffers the DL data until it receives a confirmation of successful data transmission. A new S1-AP procedure and message can be defined for this purpose.

Similar to the first example, the DL data can be ciphered by the source eNB by using the ciphering key and algorithm based on the current/re-activated AS security. Alternatively, new AS keys can be derived based on the most recent NCC value. The DL data can be ciphered with the new AS security keys. In this case, the ciphering key used for data protection may need to be used again in the target eNB. In addition, the count is reset at the target eNB. It can be specified that:

i. The source eNB uses a new key to cipher data and the count is not reset at the target eNB, for example, by transferring a sequence number to the target eNB during the context fetch, in step 236.

ii. Alternatively, the source eNB uses a new key to cipher data and the target eNB performs another key derivation to avoid using the already used key.

Step 224: Once the target eNB receives the ciphered DL data from the MME, the target eNB sends a paging message to the UE with a CFRA preamble, for example. The paging message can also contain the E-RNTI.

Step 226: In response to the paging message of step 224, the UE sends a PRACH transmission with the CFRA preamble.

Step 228: The target eNB then sends the ciphered DL data together with some control information to the UE in a DL message. The control information may comprise a time advance and an UL grant.

Step 230: At the UE, upon reception of the ciphered data, the UE performs a time adjustment, re-activates the security/ the AS security and resumes the radio bearers. The UE then deciphers the DL data.

Step 232: The UE replies back to the target eNB with a protected UL message in response to the DL data transmission (of step 228) irrespective of having UL user data or not. This UL message can include, for example, the RRCConnectionResumeRequest comprising with a resumeID and shortResumeMAC-I as in Rel-15 MO-EDT. Alternatively, a new RRC message can be defined for this step.

Step 234: Upon reception of the protected UL message (of step 232), the target eNB can notify the MME that the DL data have been successfully delivered.

Step 236: The target eNB and source eNB then perform the legacy context fetch procedure based on the resumeID sent by the UE in step 232. This procedure allows the target eNB to have the UE context. It should be noted that steps 236 and 234 can be performed in different order, e.g. step

236 can be performed before step 234 and vice versa. Furthermore, a new S1-AP procedure and message can be defined for step 236.

Step 238: The target eNB sends a message to the UE, such as the RRCConnectionRelease (resumeID, NCC).

It should be appreciated that the examples have been described in an EPS context and in terms of identifiers, interfaces, nodes, etc., in EPS, but, they can be applied also in a 5GS or mixed EPS-5GS context and in terms of (corresponding) identifiers, interfaces, nodes, etc., associated with 5GS or mixed EPS-5GS.

Also, it should be noted that the term "cipher" may mean "encrypt" or describing any other means/methods to secure/ encrypt data.

Now turning to FIG. 4, a method 400 in a network node for early data transmission will be described. The network node may be a target network node with which a wireless device wants to resume a connection, for example. The method 400 comprises:

Step 410: receiving ciphered data from a first network node.

Step 420: sending a message to a wireless device, the message comprising the ciphered data.

Step 430: in response to the sent message, receiving a message from the wireless device, the message allowing the target network node to retrieve a User Equipment (UE) context of the wireless device from the source network node.

In some embodiments, the first network node can be a source network node.

In some embodiments, method 400 may further comprise receiving an Identifier (ID) of the wireless device and an ID of the source network node, from a second network node.

In some examples, method 400 may further comprise sending, to the first network node, a request to obtain data directed to the wireless device, the request including the ID of the wireless device.

In some examples, receiving the ciphered data may be in response to the request to obtain data directed to the wireless device.

In some examples, the request to obtain data may comprise an indication of a request to re-activate a UE context of the wireless device at the first network node.

In some examples, the second network node may be a Mobility Management Entity (MME).

In some embodiments, the first network node may be a Mobility Management Entity (MME).

In some embodiments, method 400 may further comprise sending a notification to the MME for indicating that the ciphered data have been successfully transmitted to the wireless device.

In some embodiments, method 400 may comprise sending a paging message to the wireless device, the paging message including a random preamble.

In some embodiments, method 400 may further comprise receiving a Physical Random Access Channel (PRACH) transmission, the PRACH transmission including the random preamble.

In some examples, the message received from the wireless device may comprise a resume Identifier (ID).

In some embodiments, method 400 may further comprise retrieving the UE context based at least on the resume ID, from the source network node.

In some embodiments, the ciphered data may be ciphered using a current security key or a new security key based on a re-activated UE context.

In some examples, the message comprising the ciphered data sent to the wireless device may further comprise control information.

FIG. 5A illustrates a method 500 in a network node, such as source network node, for performing early data transmission (EDT) when a wireless device has suspended a connection from the source network node. The method comprises:

Step 510: re-activating a User Equipment (UE) context of the wireless device for ciphering data received from a serving gateway;

Step 520: receiving a request to retrieve the UE context from a target network node.

In some embodiments, method 400 may further comprise ciphering the data based on the re-activated UE context and sending the ciphered data to a first network node.

In some embodiments, the first network node may be the target network node.

In some embodiments, method 500 may comprise receiving a request for data for early data transmission from a target network node.

In some embodiments, the request to re-activate the UE context may comprise a UE context resume request.

In some examples, method 500 may comprise, in response to the received request, sending a request to re-activate the UE context to a second network node.

In some embodiments, the second network node may be a MME.

In some embodiments, the first network node may be a MME, which forwards the ciphered data to the target network node.

In some examples, method 400 may further comprise receiving a paging message that includes an indication of the EDT.

In some embodiments, method 400 may further comprise sending a request to re-active the UE context in response to receipt of the paging message.

In some embodiments, ciphering the received data based on the re-activated UE context may comprise ciphering the received data using one of a current security key and a new security key associated with the re-activated UE context.

In some examples, method 500 may further comprise initiating a UE context fetch procedure with the target network node in response to receiving the request to retrieve the UE context.

Now turning to FIG. 5B, a method 550 in a network node, for performing early data transmission (EDT) when a wireless device has suspended a connection from a source network node, will be described. The network node can be a MME, for example. Method 550 comprises:

Step 560: receiving a request to re-activate a UE context of the wireless device from the source network node; and Step 570: sending a response message to the source network node for re-activating the UE context.

In some examples, method 550 may further comprise receiving data directed to the wireless device from another network node.

In some examples, method 550 may further comprise sending a paging message to a target network node, the paging message including an identifier of the wireless device and an identifier of the source network node.

In some examples, method 550 may further comprise sending a paging message to the source network node, the paging message including an identifier of the wireless device and an indication of EDT.

In some examples, sending the paging message to the source network node may be in response to receiving the data directed to the wireless device.

In some examples, method 550 may further comprise receiving, from the source network node, data ciphered by the source network node.

In some examples, method 550 may further comprise sending the received ciphered data to a target network node.

In some examples, method 550 may further comprise receiving a notification from the target network node indicating that the wireless device has successfully received the data.

The above embodiments allow for secure early transmissions of MT DL data using a MT-EDT method with reduced signaling, i.e., MT DL data before Msg4 in the RA procedure. They also solve the problem of how to improve security for Rel-16 MT-EDT with DL data transmission in or scheduled with paging message or with Msg2 in contention-free random access procedure. This is in context of CP and UP MT-EDT being considered for LTE, NB-IoT, and 5G/NR.

Figure 6:
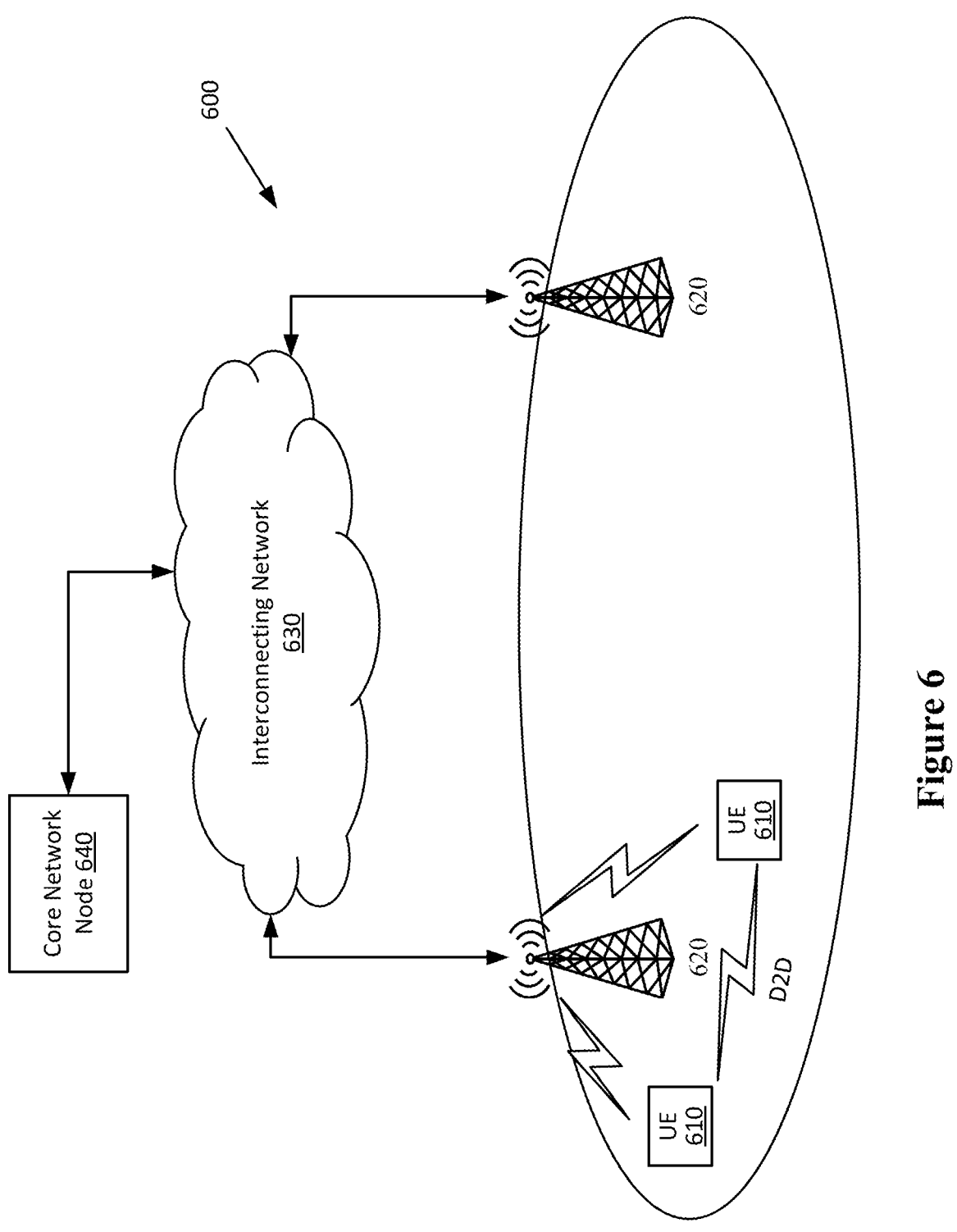
FIG. 6 illustrates one example of a wireless communications system in which embodiments of the present disclosure may be implemented.

FIG. 6 illustrates an example of a wireless network 600 that may be used for wireless communications. Wireless network 600 includes UEs 610 and a plurality of radio network nodes 620 (e.g., Node Bs (NBs) Radio Network Controllers (RNCs), evolved NBs (eNBs), next generation NB (gNBs), etc.) directly or indirectly connected to a core network 640 which may comprise various core network nodes. The network 600 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 610 may be capable of communicating directly with radio network nodes 620 over a wireless interface. In certain embodiments, UEs may also be capable of communicating with each other via device-to-device (D2D) communication. In certain embodiments, network nodes 620 may also be capable of communicating with each other, e.g. via an interface (e.g. X2 in LTE or other suitable interface).

As an example, UE 610 may communicate with radio network node 620 over a wireless interface. That is, UE 610 may transmit wireless signals to and/or receive wireless signals from radio network node 620. The wireless signals may contain voice traffic, data traffic, control signals, and/or any other suitable information. In some embodiments, an area of wireless signal coverage associated with a radio network node 620 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc. Example embodiments of a wireless device 610 are described in more detail below with respect to FIG. 7.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc., a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 620 may interface with a radio network controller (not shown). The radio network controller may control network nodes 620 and may provide certain radio resource management functions, mobility management functions, and/or other suitable functions. In certain embodiments, the functions of the radio network controller may be included in the network node 620. The radio network controller may interface with the core network node 640. In certain embodiments, the radio network controller may interface with the core network node 640 via the interconnecting network 630.

The interconnecting network 630 may refer to any interconnecting system capable of transmitting audio, video, signals, data, messages, or any combination of the preceding. The interconnecting network 630 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 640 may manage the establishment of communication sessions and various other functionalities for wireless devices 610. Examples of core network node 640 may include MSC, MME, SGW, PGW, O&M, OSS, SON, positioning node (e.g. E-SMLC), MDT node, etc. Wireless devices 110 may exchange certain signals with the core network node 640 using the non-access stratum layer. In non-access stratum signaling, signals between wireless devices 610 and the core network node 640 may be transparently passed through the radio access network. In certain embodiments, network nodes 620 may interface with one or more other network nodes over an internode interface. For example, network nodes 620 may interface each other over an X2 interface.

Although FIG. 6 illustrates a particular arrangement of network 600, the present disclosure contemplates that the various embodiments described herein may be applied to a variety of networks having any suitable configuration. For example, network 600 may include any suitable number of wireless devices 610 and network nodes 620, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

The communication system 600 may itself be connected to a host computer (not shown), which may be embodied in the hardware and/or software of a standalone server, a cloud-implemented server, a distributed server or as processing resources in a server farm. The host computer may be under the ownership or control of a service provider or may be operated by the service provider or on behalf of the service provider. The connections between the communication system 600 and the host computer may extend directly from the core network 640 to the host computer or may extend via the intermediate network 630.

The communication system of FIG. 6 as a whole enables connectivity between one of the connected wireless devices (WDs) 610 and the host computer. The connectivity may be described as an over-the-top (OTT) connection. The host computer and the connected WDs 610 are configured to communicate data and/or signaling via the OTT connection, using an access network, the core network 640, any intermediate network 630 and possible further infrastructure (not shown) as intermediaries. The OTT connection may be transparent in the sense that at least some of the participating communication devices through which the OTT connection passes are unaware of routing of uplink and downlink communications.

The host computer may provide host applications which may be operable to provide a service to a remote user, such as a WD 610 connecting via an OTT connection terminating at the WD 610 and the host computer. In providing the service to the remote user, the host application may provide user data which is transmitted using the OTT connection. The "user data" may be data and information described herein as implementing the described functionality. In one embodiment, the host computer may be configured for providing control and functionality to a service provider and may be operated by the service provider or on behalf of the service provider. The host computer may be enabled to observe, monitor, control, transmit to and/or receive from the network node 620 and or the wireless device 610.

One or more of the various embodiments in this disclosure improve the performance of OTT services provided to the WD 610 using the OTT connection. More precisely, the teachings of some of these embodiments may improve the data rate, latency, and/or power consumption and thereby provide benefits such as reduced user waiting time, relaxed restriction on file size, better responsiveness, extended battery lifetime, etc.

FIG. 7 is a schematic block diagram of the wireless device 610 according to some embodiments of the present disclosure. As illustrated, the wireless device 610 includes circuitry 700 comprising one or more processors 710, e.g., Central Processing Units (CPUs), Application Specific Integrated Circuits (ASICs), Field Programmable Gate Arrays (FPGAs), and/or the like) and memory 720. The wireless device 610 also includes one or more transceivers 730 that each include one or more transmitters 740 and one or more receivers 750 coupled to one or more antennas 760. The wireless device 610 may also comprise a network interface and more specifically an input interface 770 and an output interface 780 for communicating with other nodes. The wireless device may also comprise a power source 790.

In some embodiments, the functionality of the wireless device 610 described above may be fully or partially implemented in software that is, e.g., stored in the memory 720 and executed by the processor(s) 710. For example, the processor 710 is configured to perform any of the functionalities of the wireless device 610.

In some embodiments, a computer program including instructions which, when executed by the at least one processor 710, causes the at least one processor 710 to carry out the functionality of the wireless device 610 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 8:
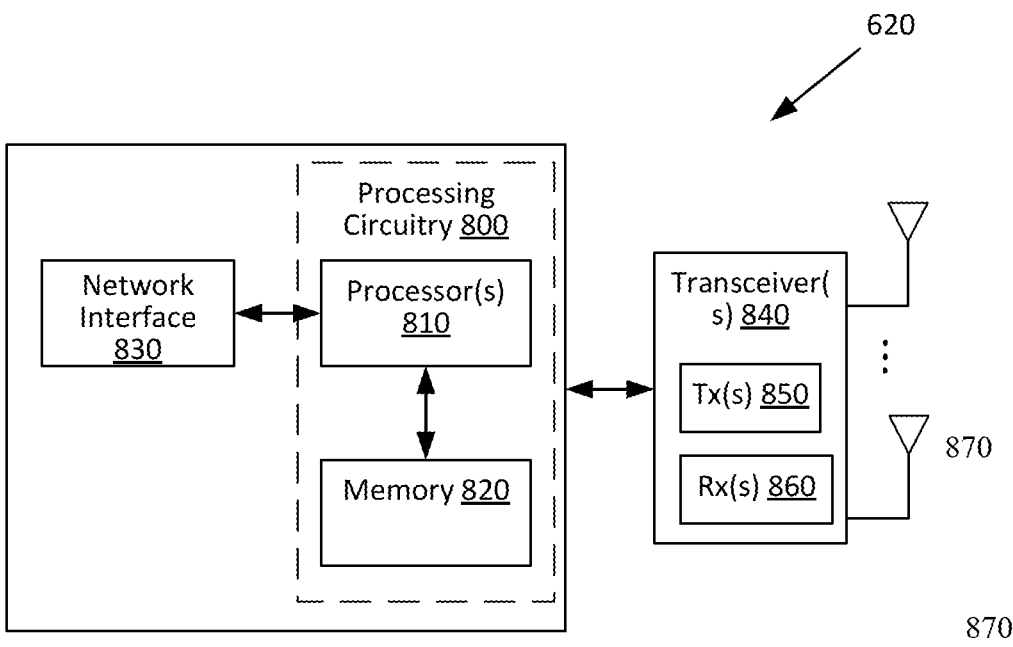
FIGS. 8 and 9 are block diagrams that illustrate a network node according to some embodiments.

FIG. 8 is a schematic block diagram of a network node 620 according to some embodiments of the present disclosure. The network node 620 can be a target network node or a source network node or even a MME. As illustrated, the network node 620 includes a processing circuitry 800 comprising one or more processors 810 (e.g., CPUs, ASICs, FPGAs, and/or the like) and memory 820. The network node also comprises a network interface 830. The network node 620 also includes one or more transceivers 840 that each include one or more transmitters 850 and one or more receivers 860 coupled to one or more antennas 870. In some embodiments, the functionality of the network node 620 described above may be fully or partially implemented in software that is, e.g., stored in the memory 820 and executed by the processor(s) 810. For example, the processor 810 can be configured to perform the method 400 of FIG. 4, when the network node 620 is a target network node. The processor 810 can be configured to perform method 500 of FIG. 5A, when the network node 620 is a source network node. And the processor 810 can be configured to perform method 550 of FIG. 5B, when the network node 620 is a MME.

Figure 9:
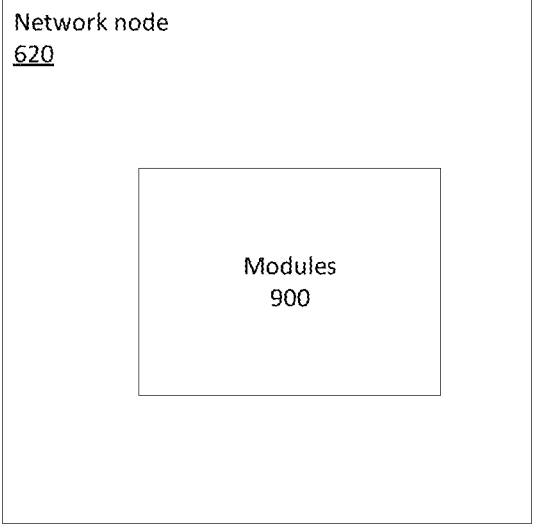

FIG. 9 is a schematic block diagram of the network node 620 according to some other embodiments of the present disclosure. The network node 620 includes one or more modules 900, each of which is implemented in software. The module(s) 900 provide the functionality of the network node 620 described herein. The module(s) 900 may comprise, for example, a receiving module operable to perform steps 410 and 430 of FIG. 4 and/or step 520 of FIG. 5A and/or step 560 of FIG. 5B, a sending module operable to perform step 420 of FIG. 4 and/or step 570 of FIG. 5B, and a re-activating module operable to perform step 510 of FIG. 5A.

Figure 10:
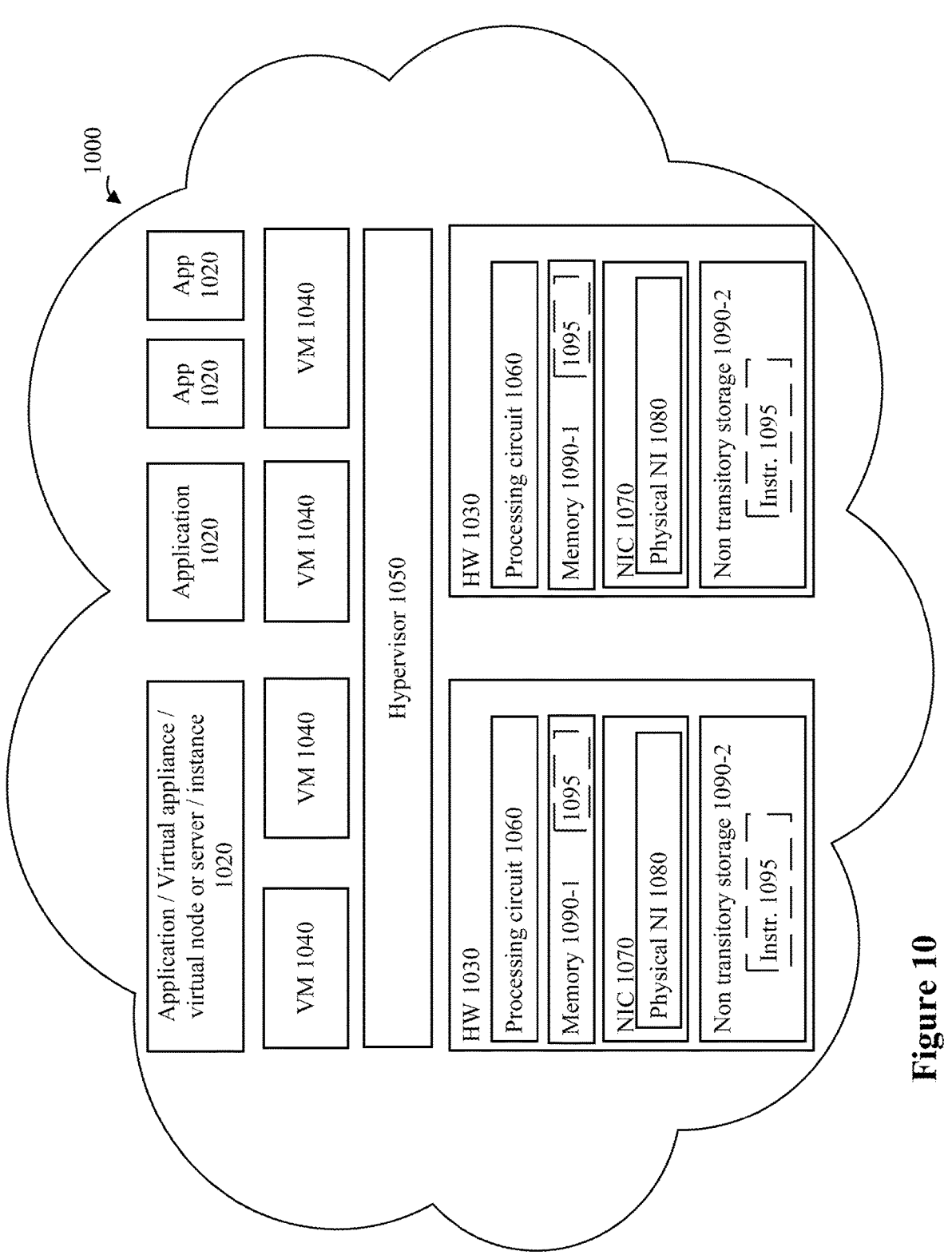
FIG. 10 illustrates a virtualized environment of a network node, according to some embodiments.

FIG. 10 is a schematic block diagram that illustrates a virtualized embodiment of the wireless device 610 or network node 620, according to some embodiments of the present disclosure. As used herein, a "virtualized" node 1000 is a network node 620 or wireless device 610 in which at least a portion of the functionality of the network node 620 or wireless device 610 is implemented as a virtual component (e.g., via a virtual machine(s) executing on a physical processing node(s) in a network(s)). For example, in FIG. 10, there is provided an instance or a virtual appliance 1020 implementing the methods or parts of the methods of some embodiments. The one or more instance(s) runs in a cloud computing environment 1000. The cloud computing environment provides processing circuits 1030 and memory 1090-1 for the one or more instance(s) or virtual applications 1020. The memory 1090-1 contains instructions 1095 executable by the processing circuit 1060 whereby the instance 1020 is operative to execute the methods or part of the methods described herein in relation to some embodiments.

The cloud computing environment 1000 comprises one or more general-purpose network devices including hardware 1030 comprising a set of one or more processor(s) or processing circuits 1060, which may be commercial off-the-shelf (COTS) processors, dedicated Application Specific Integrated Circuits (ASICs), or any other type of processing circuit including digital or analog hardware components or special purpose processors, and network interface controller(s) (NICs) 1070, also known as network interface cards, which include physical Network Interface 1080. The general-purpose network device also includes non-transitory machine readable storage media 1090-2 having stored therein software and/or instructions 1095 executable by the processor 1060. During operation, the processor(s)/processing circuits 1060 execute the software/instructions 1095 to instantiate a hypervisor 1050, sometimes referred to as a virtual machine monitor (VMM), and one or more virtual machines 1040 that are run by the hypervisor 1050.

A virtual machine 1040 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1040, and that part of the hardware 1030 that executes that virtual machine 1040, be it hardware 1030 dedicated to that virtual machine 1040 and/or time slices of hardware 1030 temporally shared by that virtual machine 1040 with others of the virtual machine(s) 1040, forms a separate virtual network element(s) (VNE).

The hypervisor 1050 may present a virtual operating platform that appears like networking hardware to virtual machine 1040, and the virtual machine 1040 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1020 may be implemented on one or more of the virtual machine(s) 1040, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or nonvolatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

What is claimed is:

1. A method in a target network node for performing early data transmission (EDT), the method comprising:

when a wireless device has suspended a connection from a source network node receiving ciphered data from a first network node;

sending a message to the wireless device, the message comprising the ciphered data together with control information, the control information comprising a time advance and an uplink (UL) grant;

in response to the sent message, receiving a message from the wireless device, wherein the message received from the wireless device comprises a resume Identifier (ID), and wherein the message from the wireless device allows the target network node to retrieve a User Equipment (UE) context of the wireless device from the source network node based at least on the resume ID; and upon reception of the message from the wireless device, performing by a target evolved node B (eNB) and a source eNB, legacy context fetch based on the resumeID.

2. The method of claim 1, wherein the first network node is the source network node.

3. The method of claim 1, further comprising receiving a message from a second network node, the message from the second network node including an identity (ID) of the wireless device and an identity of the first network node.

4. The method of claim 3, further comprising sending, to the first network node, a request to obtain data directed to the wireless device, the request including the ID of the wireless device and wherein receiving the ciphered data is in response to the request to obtain the data directed to the wireless device.

5. The method of claim 4, wherein the request to obtain the data comprises an indication of a request to re-activate a UE context of the wireless device at the first network node.

6. The method of claim 1, wherein the first network node is a Mobility Management Entity (MME).

7. The method of claim 6, further comprising sending a notification to the MME for indicating that the ciphered data have been successfully transmitted to the wireless device.

8. The method of claim 1, further comprising sending a paging message to the wireless device, the paging message including a random preamble.

9. The method of claim 1, wherein the ciphered data are ciphered using one of a current security key and a new security key based on a re-activated UE context.

10. A target network node, comprising a communication interface and processing circuitry connected thereto and configured to perform:

when a wireless device has suspended a connection from a source network node, receiving ciphered data from a first network node;

sending a message to a wireless device, the message comprising the ciphered data together with control information, the control information comprising a time advance and an uplink (UL) grant;

in response to the sent message, receiving a message from the wireless device, wherein the message received from the wireless device comprises a resume Identifier (ID), and wherein the message from the wireless device allows the target network node to retrieve a User Equipment (UE) context of the wireless device from a source network node based at least on the resume ID; and upon reception of the message from the wireless device, performing by a target evolved node B (eNB) and a source eNB, legacy context fetch based on the resumeID.

11. A method in a source network node for performing early data transmission (EDT), the method comprising:

when a wireless device has suspended a connection from a source network node, re-activating a User Equipment (UE) context of the wireless device for ciphering data received from a serving gateway, the data comprising an ID of the UE allocated by the source network node to the wireless device, wherein the source network node allows a target evolved node B (eNB) to know which source network node, the wireless device was suspended from, whereas the ID of the UE allows the network node to know for which wireless device it needs to locate the context;

receiving a request to retrieve the UE context from a target network node, wherein retrieving the UE context of the wireless device is based at least on a resume identifier that is comprised in a message received by the target network node from the wireless device; and upon reception of the message from the wireless device, performing by the target eNB and a source eNB, legacy context fetch based on the resumeID.

12. The method of claim 11, further comprising ciphering the data based on the re-activated UE context and sending the ciphered data to a first network node.

13. The method of claim 12, wherein the first network node is the target network node.

14. The method of claim 12, further comprising receiving a request for data for early data transmission from the target network node.

15. The method of claim 14, further comprising, in response to the received request, sending a new request to re-activate the UE context to a second network node, wherein the new request to re-activate the UE context comprises a UE context resume request, and wherein the second network node is a Mobility Management Entity (MME).

16. The method of claim 12, wherein the first network node is a MME, which forwards the ciphered data to the target network node.

17. The method of claim 16, further comprising receiving a paging message that includes an indication of the EDT and sending a request to re-active the UE context in response to receipt of the paging message.

18. The method of claim 12, wherein ciphering the received data based on the re-activated UE context comprises ciphering the received data using one of a current security key and a new security key associated with the re-activated UE context.

19. The method of claim 12, further comprising initiating a UE context fetch procedure with the target network node in response to receiving the request to retrieve the UE context.

* * * * *